(No Model.)
J. C. DEVLIN.
CAR BRAKE.
No. 552,046. Patented Dec. 24, 1895.
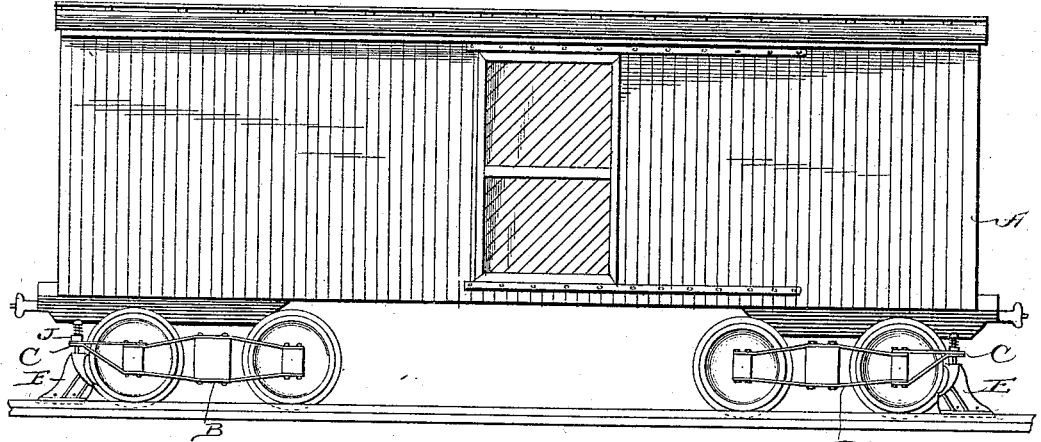
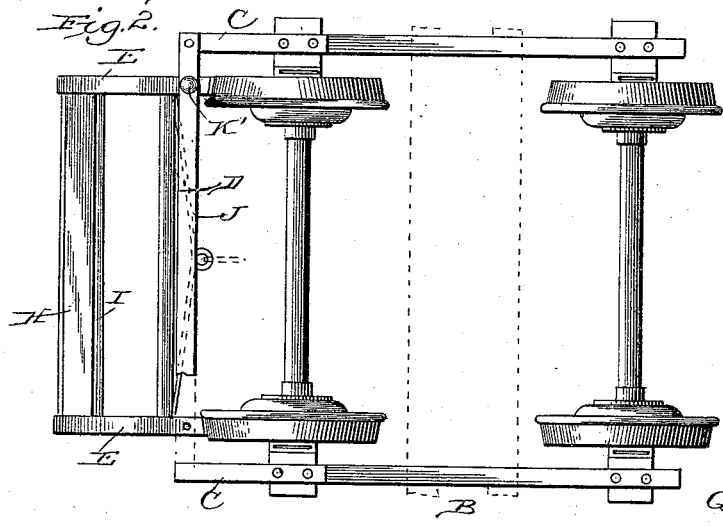
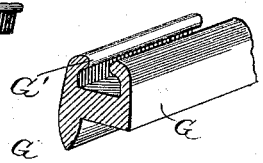
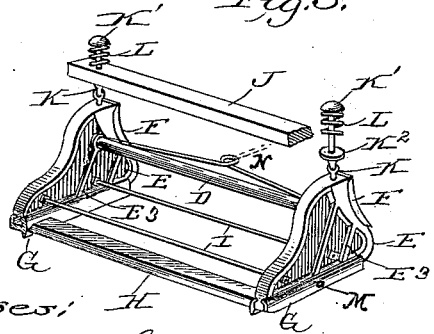
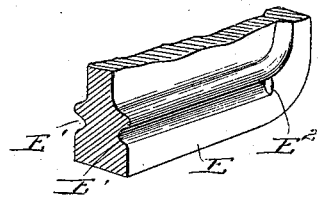
Witnesses:
Harry D. Rohrer
Herbert Bradley
Inventor:
James C. Devlin
by T. Wallace Brown,
Attorney

UNITED STATES PATENT OFFICE.

JAMES C. DEVLIN, OF HERNANDO, MISSISSIPPI.

CAR-BRAKE.

SPECIFICATION forming part of Letters Patent No. 552,046, dated December 24, 1895.

Application filed April 10, 1895. Serial No. 545,152. (No model.)

*To all whom it may concern:*

Be it known that I, JAMES C. DEVLIN, a citizen of the United States, residing at Hernando, in the county of De Soto and State of Mississippi, have invented new and useful Improvements in Car-Brakes, of which the following is a specification.

The invention relates to brakes adapted to replace those now commonly used without changing the car, the trucks, or the brake-operating mechanism, whether the latter be hand or power actuated.

The object of the invention is to provide a brake that shall be simple, strong, very powerful, not liable to cause vibration of the car, nor to throw the truck from the track in the event of its becoming detached either wholly or partially, and that may be readily and quickly substituted for the common brake upon any car. Certain of these ends are attained by suspending the brake from the truck instead of from the car itself, and so arranging it that under light force it acts precisely like the common brake, but so that under greater stress it automatically acts upon the rail as well as upon the wheel.

In the drawings, Figure 1 is a side elevation of a freight-car with my novel brakes at the outer ends only of the two sets of trucks. Fig. 2 is a plan view of one set of trucks with the same devices in position thereon, some small portion being broken away. Fig. 3 is a perspective view of the brake detached. Figs. 4 and 5 are detail views.

In the figures, A represents any car, and B B' its two sets of trucks. To the outer end of the truck-frame are rigidly secured bars C to support the brake. These bars may, with most forms of trucks, be secured by simply removing the bolts already in place and passing them again into position through suitable apertures formed in the bars; but in making new truck-frames for this brake the bars C may be integral extensions of the frame itself.

The brake consists of a common brake-beam D having at its ends cast plates E E instead of the usual shoe-retaining castings, brake-shoes F, which may be the usual ones, shoes G on the lower margins of the plates in position to meet the rails when depressed, a transverse plank or platform H just above the front ends of the shoes G, and one or more rods I tying the two plates E together. The bars C are preferably connected by a cross-bar J. From the brake structure just described strong rods K pass upward through the bars C and cross-bars J and terminate at some distance above the latter in large heads K'. Between these heads and the cross-bar strong springs L are coiled about the rods to resist their downward movement, and just below the bars C the rods are provided with heavy collars $K^2$ to prevent upward movement. Below the collars the rods are preferably jointed, although if the apertures in the bars C and cross-bars J be materially larger than the rods this is not indispensable. The parts are so proportioned that the brake, which is supported only by the springs with its shoe a little above the rail, may be forced down upon the rail by compressing the spring, the latter of course instantly raising it when the compressing force ceases to act. The wheel-shoe is removably retained in place by the usual devices. The rail-shoe is U-shaped in cross-section and is provided with internal ribs G' to slide rearward into engagement with grooves E' in the sides of the plates E and near the lower edges thereof. The grooves do not extend entirely across the plates, but terminate abruptly in shoulders $E^2$, which effectually prevent the shoe from being forced rearward by contact with the rail. Forward displacement is prevented by a key or bolt M. Thus the shoe, while readily detachable, is secure against accidental displacement and by devices which are not liable to breakage by rough use. The shoe is further provided with a flange $G^3$, which normally runs at about the level of the top of the rail, but which lies alongside the inner face of the rail when the brake is depressed. The plates E, preferably provided with lateral strengthening-ribs $E^3$, are recessed near their front ends and a little above the shoe G to receive the end of the foot-board H, which is held in the recesses by rods I. The foot-board projects slightly beyond the end of the car-body, and thus serves as a platform upon which the brake-man may stand while between slowly-moving cars for coupling or other purposes. His security while in such position is not dependent upon the absence of obstructions or inequalities upon the ground over which he passes.

The brake-operating devices, no matter what their character, are connected to the brake-beam in the usual manner at N, and if the brake-beam be drawn toward the wheel by moderate force the wheel-shoe acts in precisely the same manner as in the ordinary brake mechanisms, the friction of the wheel not being sufficient to compress the springs L; but if the force, and consequently the friction, be increased the springs yield and the wheel carries the whole brake downward until the shoe G presses upon the rail. The instant this happens the friction upon both the rail and wheel automatically increases enormously, for friction upon the rail forces the wheel-shoe against the wheel with great force and the wheel in turn presses the rail-shoe down so much the more strongly. Moreover, the friction upon the rail presses the lower portion of the brake beneath the overhanging portion of the wheel, and thus by a sort of wedging action increases its own pressure upon the rail independently of the wheel's rotation. It is, however, of vital importance that the rail-shoe should not meet the rail far beneath such overhanging part of the wheel; otherwise the brake will not release itself when the brake-operating force ceases to act upon the brake-beam and the brake will be practically worthless.

When ordinary brakes are applied, a very disagreeable jar is imparted to the car because the brake is suspended from it and the grinding of the shoe as it slips over the wheel directly affects the car above, but with this apparatus the unpleasant effect is wholly avoided.

It is well understood by all railroad-men that the ordinary brake causes many accidents, for if by chance one end of the beam falls, which often happens where the number of cars is very great, the truck is almost certain to be thrown from the track; but with this mechanism accidental detachment at one end, or even at both, merely allows the brake to drop slightly and assume its braking position at either or both ends of the beam, the flange and the remaining support or both flanges serving to prevent lateral displacement and the wheels holding the parts down in contact with the rail or rails.

It is evident that many of the details shown may be varied in construction, and I do not, therefore, wish to limit myself to the exact forms illustrated, but desire to cover all forms that embody my invention.

What I claim is—

1. The combination with the truck frame, of the bars projecting forward beyond the wheels from the same, a crossbar resting upon said bars, rods sliding vertically in ways in said crossbar, springs arranged to offer yielding resistance to downward movement of said rods, a brake provided with both wheel impinging shoes and rail impinging shoes and supported wholly by said rods, and means for swinging said brake toward the wheels.

2. The combination with a car body and a truck frame supporting the end of the same, of a brake supported from said frame and provided with wheel-impinging shoes and with rail impinging shoes, and a foot-board carried by the brake in approximately the end plane of the car body, whereby a brakeman at the end of the car for coupling and the like may step upon the foot-board and be carried on with the car.

3. The combination with the spring-supported, horizontally swinging plates connected by the brake beam and provided with grooves extending from the front rearward partially across the same, of the U-shaped flanged shoe having internal ribs adapted to slide into said grooves and abut against their end walls, substantially as set forth.

4. The combination with the car and its truck, of the rigid bars projecting from the truck forward beyond the wheels, the crossbar fixed upon said bars, the headed rods sliding vertically in said crossbar and jointed below the same, the spring resting upon the crossbar and supporting the heads of the rods, the collars resisting upward movement of the rods, the brake supported by said rods and consisting of the end plates, the wheel and the rail shoes, the platform and the connecting rod, and means for forcing the brake toward the wheels.

JAMES C. DEVLIN.

Witnesses:
H. M. STERLING,
WALLACE GREENE.